United States Patent [19]

Nakahara et al.

[11] Patent Number: 5,379,326
[45] Date of Patent: Jan. 3, 1995

[54] SYNCHRONIZATION CONTROL CIRCUIT FOR TDMA CELLULAR COMMUNICATION SYSTEM

[75] Inventors: Kenji Nakahara; Hiroyuki Kaneda, both of Tokyo, Japan

[73] Assignee: NEC Corporation, Tokyo, Japan

[21] Appl. No.: 873,830

[22] Filed: Apr. 27, 1992

[30] Foreign Application Priority Data

Apr. 27, 1991 [JP] Japan .................................. 3-124765

[51] Int. Cl.⁶ .............................................. H04L 7/00
[52] U.S. Cl. ..................... 375/106; 370/95.3; 370/100.1; 375/107
[58] Field of Search ............. 375/106, 107; 370/95.3, 370/100.1, 104.1, 105, 105.2; 379/59, 60; 455/54.1, 54.2

[56] References Cited

U.S. PATENT DOCUMENTS

| | | | |
|---|---|---|---|
| 4,398,291 | 8/1983 | Hotta et al. | 370/95.3 |
| 4,491,947 | 1/1985 | Frank | 370/94.2 |
| 4,561,099 | 12/1985 | Atsugi et al. | 370/104.1 |
| 5,237,592 | 8/1993 | Nonami | 375/106 |

FOREIGN PATENT DOCUMENTS 0149136 7/1985 European Pat. Off. .
8000902 5/1980 WIPO .

OTHER PUBLICATIONS

GSM 05.01 Physical Layer on the Radio Path: General Description (Version 3.3.1), FIGS. 1 and 4.
I. Shimizu et al, "New Digital Mobile Radio Technologies", NTT Review, vol. 4, No. 1, Jan. 1992, pp. 64–69.

Primary Examiner—Stephen Chin
Assistant Examiner—Don Vo
Attorney, Agent, or Firm—Sughrue, Mion, Zinn, Macpeak & Seas

[57] ABSTRACT

A synchronization control circuit applicable to a TDMA (Time Division Multiple Access) digital mobile communication system for controlling the transmission and reception time base of a mobile station on which the circuit is mounted. The synchronization control circuit includes a plurality of time base counter circuits each counting down standard clock pulses to generate a plurality of timing pulse sequences having time bases which are respectively associated with the cells of the system. All the time base counter circuits share a single counter controller which controls the writing and reading of counts out of the time base counter circuits. The counter controller selectively produces the outputs of one of the time base counter circuits as a timing pulse sequence. The synchronization control circuit, therefore, is small size and light weight and saves power.

10 Claims, 6 Drawing Sheets

SYNCHRONIZATION CONTROL CIRCUIT FOR TDMA CELLULAR COMMUNICATION SYSTEM

BACKGROUND OF THE INVENTION

1. Field of the Invention

The present invention relates to a synchronization control circuit mounted on a mobile station in a TDMA (Time Division Multiple Access) cellular communication system.

2. Description of the Prior Art

There is an increasing demand for mobile communication services using automobile telephones and portable telephones. To meet this demand, it is necessary to increase the number of mobile stations which can be accommodated in a system while improving communication quality. On the other hand, a cellular mobile communication system entirely digitized by a TDM scheme is now under development for introducing various kinds of new services. In a TDM cellular communication system, each mobile station monitors, in a time slot other than the one assigned to a base station of a cell where it is located, the reception levels of carriers (referred to as frequency channels hereinafter) received from the other base stations and switches, if necessary, the frequency channel thereof to one assigned to the base station of an adjacent cell. Since the change in frequency channel causes the time base to shift, the mobile station has to be provided with means for defining a plurality of time bases matching the frequency channels of a plurality of adjacent base stations. Such means has customarily been implemented as a synchronization control circuit having a time base counter constituted by a counter for counting clock pulses having a predetermined period, and a counter controller for controlling the initialization of the time base counter and the read-out of a count.

It is a common practice with the above-described synchronization control circuit to arrange a one-to-one relationship between counter controllers and time base counters. Such a configuration makes it difficult to reduce the size, weight and power consumption of the mobile station. This is especially true with a portable mobile station which has to be miniature and consume a minimum amount of power.

BRIEF SUMMARY OF THE INVENTION (1) Object of the Invention

It is therefore an object of the present invention to provide a synchronization control circuit which reduces the size and weight of a mobile station included in a TDMA cellular communication system while saving power.

(2) Summary of the Invention

A synchronization control circuit of the present invention controls a plurality of time base counter circuits by a single counter controller on a time sharing basis. Therefore, the control circuit promotes the miniaturization and power saving operation of a mobile station.

BRIEF DESCRIPTION OF THE DRAWINGS

The above-mentioned and other objects, features and advantages of the present invention will become more apparent by reference to the following detailed description of the invention taken in conjunction with the accompanying drawings, wherein.

DETAILED DESCRIPTION OF THE PREFERRED EMBODIMENT

Figure 1:
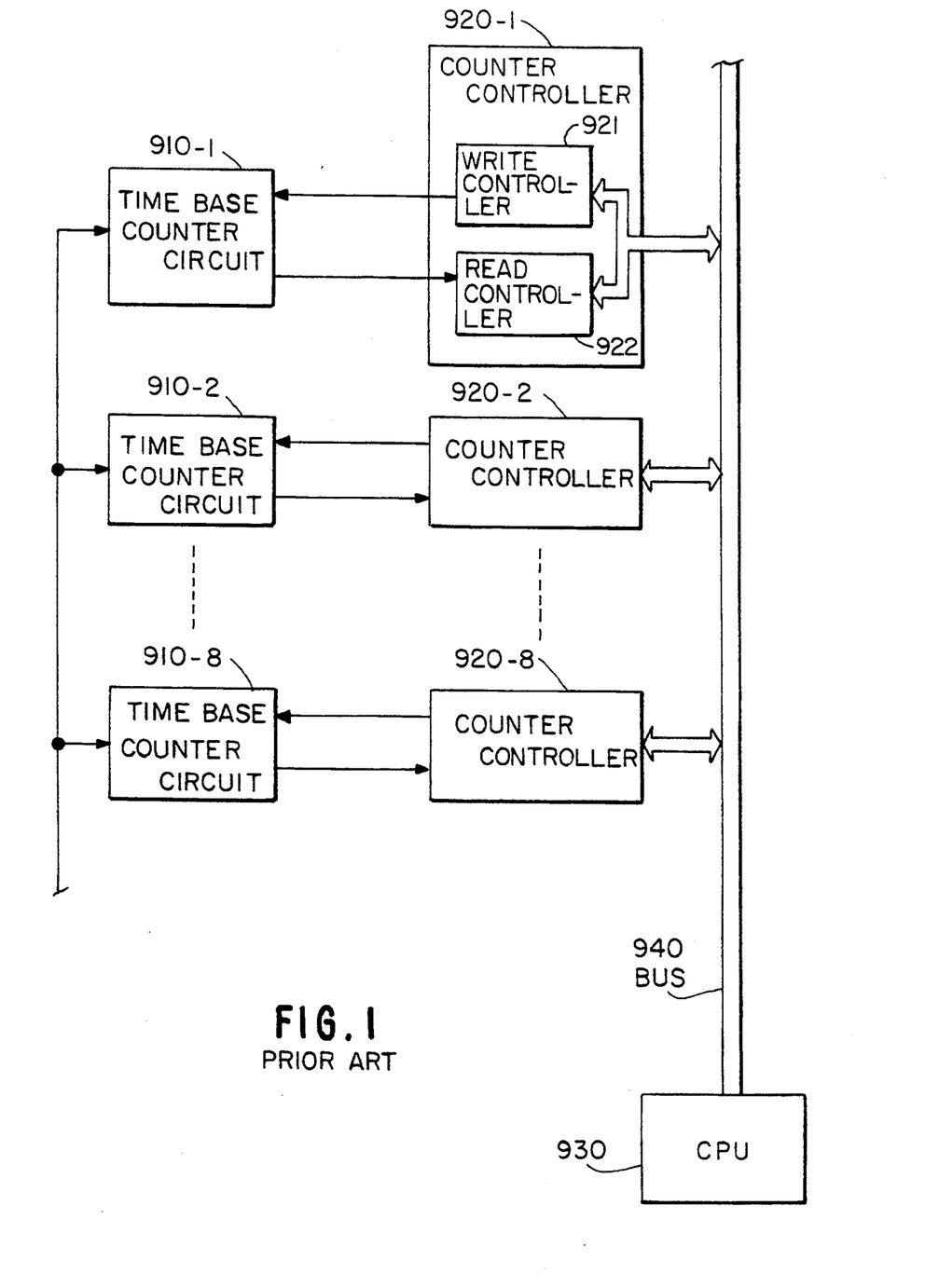
FIG. 1 is a block diagram schematically showing a conventional synchronization control circuit.

To better understand the present invention, a brief reference will be made to a conventional synchronization control circuit, shown in FIG. 1. As shown, the control circuit includes independent time base counter circuits 910-1 to 910-8 which are each assigned to a respective one of eight channels, i.e., one channel assigned to a cell where the mobile station is located, six channels assigned to base stations situated in a plurality of adjacent cells, and one standby channel. Counter controllers 920-1 to 920-8 are associated with the time base counter circuits 910-1 to 910-8, respectively. The time base counter circuits 910-1 to 910-8 each include a plurality of counters, not shown, for generating various kinds of timing signals synchronous to TDMA frames which will be described by counting standard clock pulses. A CPU (Central Processing Unit) 930 inputs and outputs data to a bus 940 on an eight bit basis. The counter controllers 920-1 to 920-8 each have a write controller 921 and a read controller 922 each including a buffer register, not shown, for absorbing a difference in length between the count bits of the associated time base counter circuit 910 and the data bits from the CPU 930, as represented by the counter controller 920-1 in the figure.

The CPU 930 selects one of the counter controllers 920-1 to 920-8 matching the channel which is the subject of synchronization control. In this condition, the CPU 930 initializes or corrects the counts of the time base counter circuit 910 associated with the counter controller 920 of interest via the write controller 921 or reads the counts of the time base counter 910 via the read controller 922. By such a procedure, the CPU 930 controls the synchronization of signals to be interchanged between the mobile station and a base station, not shown.

Figure 2:
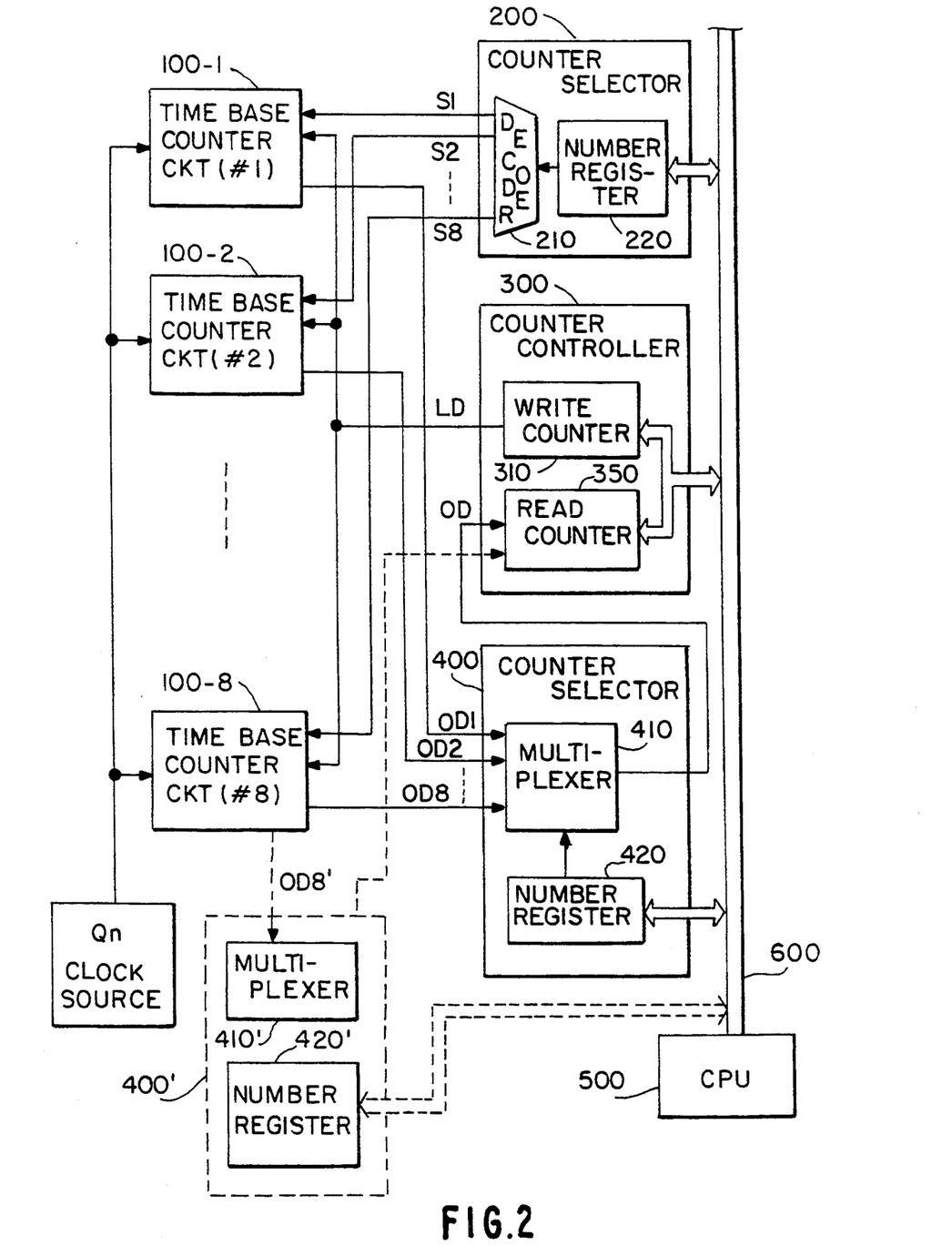
FIG. 2 is a block diagram schematically showing a synchronization control circuit embodying the present invention.

Referring to FIG. 2, a synchronization control circuit embodying the present invention will be described which conforms to GSM (Group Special Mobile) PLMN (Public Land Mobile Network) proposed by GSM of ETSI (European Telecommunication Standardizing Institute). As shown, the synchronization control circuit includes eight independent time base counter circuits 100-1 to 100-8 each generating various kinds of timing signals synchronous to TDMA frames, which will be described by counting standard clock pulses. A counter controller 300 has a write controller 310 and a read controller 350 which respectively write and read counts out of the time base counter circuits 100-1 to 100-8. A counter selector 200 selects one of the time base counter circuits 100-1 to 100-8 to which counts should be written. A counter selector 400 selects one of the time base counters 100-1 to 100-8 from which counts should be read. A CPU 500 interchanges data with the counter controller 300 and counter selectors 200 and 400 over a bus 600 to thereby control the synchronization of signals to be interchanged between the mobile station and a base station, not shown.

The general construction of a mobile station to which the embodiment is applicable is disclosed in, for example, "New Digital Mobile Radio Technology", NTT REVIEW VOL. 4, NO. 1 (JAN. 1992), pp. 64–69 and, therefore, will not be described specifically herein.

The air interface between the mobile station and a base station is implemented by a TDMA access system. The TDMA system has a frame configuration in which each hyperframe has 2,048 superframes, each superframe has 1,326 TDMA frames, and each TDMA frame has eight time slots, as shown in a GSM recommendation "GSM 05.01 Physical layer on the radio path: General description (version 3.3.1)", FIG. 1. Twenty-six fifty-one TDMA frames constitute a single multiframe. A single time slot has a duration corresponding to the transmission duration of 156.25 bits. Transmission is effected in bursts.

The mobile station communicates with the base belonging to a cell where it is located by using any one of the eight time slots of a TDMA frame, while monitoring the carrier levels on the down-link channels from the base stations of adjacent cells by using the other time sots (see a GSM recommendation "GSM 05.02 Multiplexing and multiple access on the radio path (Version 3.5.0)", page 31, FIG. 4). The time bases of frequency channels assigned to the down-link signals are not coincident, as stated earlier. In light of this, when the mobile station changes the frequency channel in the vicinity of the end of the cell, one of the time base counter circuits 100-1 to 100-8 which are associated with the seven adjacent base stations is selected to prepare for TDMA reception.

Figure 3:
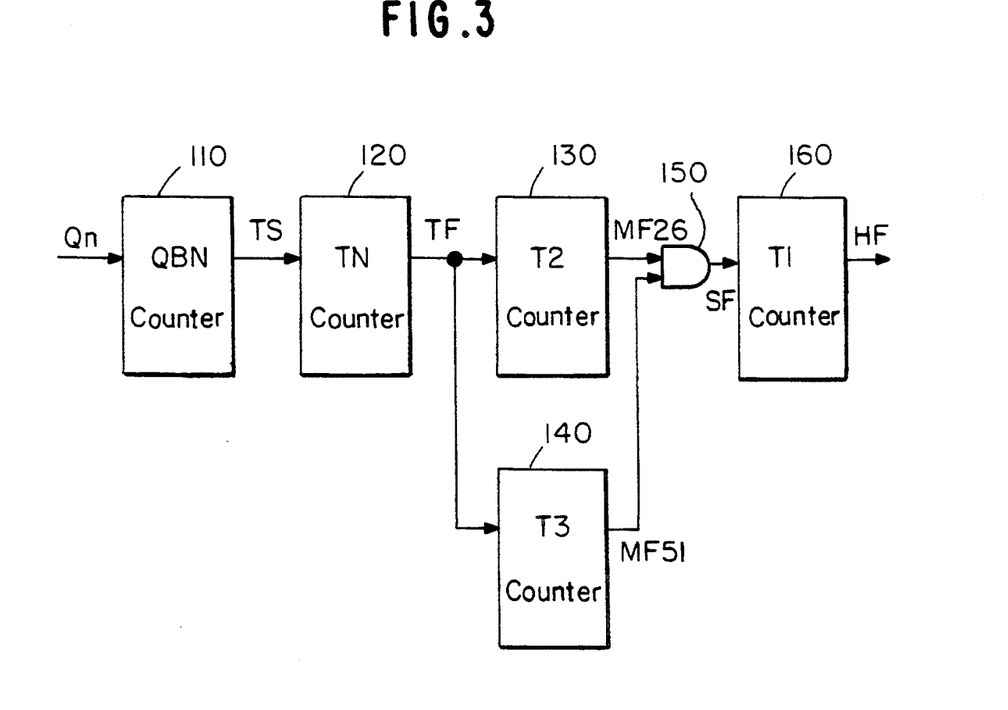
FIG. 3 is a schematic block diagram showing a specific construction of a time base counter circuit.
Figure 4:
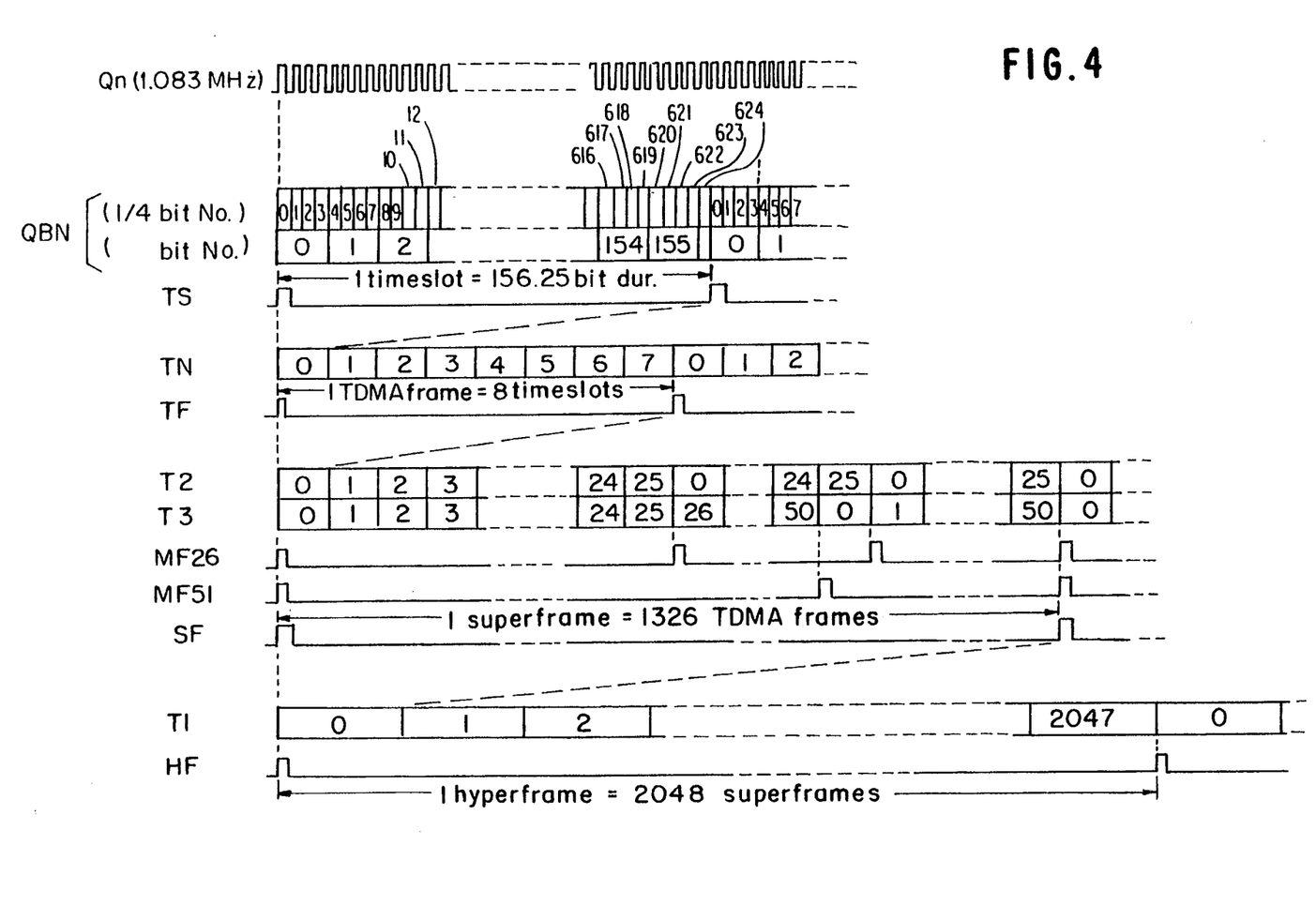
FIG. 4 is a timing chart demonstrating a specific operation of the time base counter circuit shown in FIG. 3.

FIG. 3 shows a specific construction of one of the time base counter circuits 100-1 to 100-8, while FIG. 4 shows waveforms representative of a specific operation thereof. As shown, a QBN counter 110 counts clock pulses Qn having a frequency of 1.083 MHz and a period corresponding to one-quarter of a bit and outputs a carry pulse TS at every interval corresponding to 156.25 bits to indicate the beginning of the time slot assigned for communication. In FIG. 4, serial numbers are given to 625 ¼-bit long time slots and 155.25 1-bit long time slots accommodated in the time slot which is defined by the carry pulses TS. A TN counter 120 counts the carry pulses TS and outputs a carry pulse TF indicative of the beginning of a TDMA frame every eighth time slot assigned for communication (in FIG. 4, numbers 0–7 are given to such time slots). A T2 counter 130 counts the carry pulses TF and produces a carry pulse MF26 indicative of the beginning of a multiframe every twenty-sixth TDMA frame (in FIG. 4, frame numbers 0–25 are given). Likewise, a T3 counter 140 counts the carry pulses TF and outputs a carry pulse MF51 indicative of the beginning of a multiframe every fifty-first TDMA frame (frame numbers 0–50 are given). An AND gate 150 outputs a pulse SF representative of the beginning of a superframe only when the pulses MF26 and MF51 appear at the same time, i.e., every 1,326th TDMA frame (26×51=1,326). Further, a T1 counter 160 counts the pulses SF and outputs a carry pulse HF indicative of the beginning of a hyperframe every 2,048th superframe (superframe numbers 0–2, 047 are given).

Referring again to FIG. 2, the CPU 500 controls the counter selectors 200 and 400 and counter controller 300 via a CPU bus 600 so as to set and read the counts of the above-mentioned counter group (QBN, TN, T2, T3 and T1) included in each of the time base counter circuits 100-1 to 100-8. The CPU bus 600 is made up of an address bus for designating the address (16-bit long) of a circuit to be connected thereto, a data bus for interchanging data (8-bit long), and a control bus for specifying a direction of data transfer (Write or Read), as will be described in detail later with reference to FIGS. 5 and 6.

How to write initial values or correction values in the counter groups of the time base counters 100-1 to 100-8 is as follows. On selecting one of the time base counter circuits 100-1 to 100-8, the CPU 500 delivers the corresponding number (e.g. #1 in the case of the time base counter circuit 100-1) to the bus 600 together with the address of the counter selector 200. As the counter selector 200 detects its own address on the address bus, it registers the number on the data bus at a number register 220. A decoder 210 renders one of the selection control signals S1–S8 (e.g. S1 in the case of #1) active on the basis of the number registered at the number register 220. The selection control signals S1–S8 are fed to the time base counter circuits 100-1 to 100-8, respectively. Hence, only one of the time base counter circuits 100-1 to 100-8 associated with the active selection control signal becomes ready to write counts therein.

Subsequently, the CPU 500 outputs data to be written to the selected time base counter circuit 100 to the bus 600. The write controller 310 of the counter controller 300 temporarily stores the data to be fed from the CPU 500 to the time base counter circuit 100 of interest via the data bus.

Figure 5:
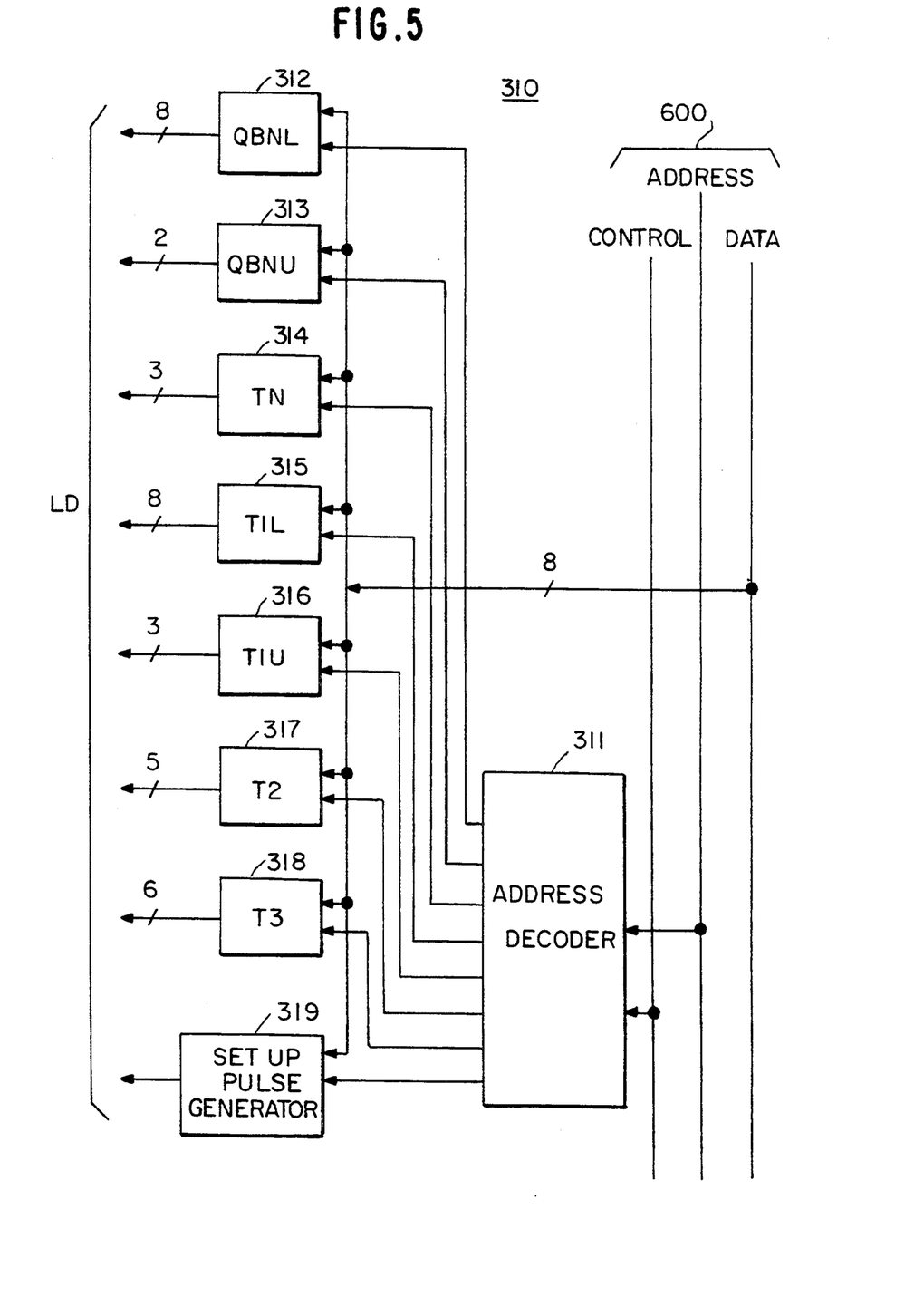
FIG. 5 is a schematic block diagram showing a specific construction of a write controller included in the embodiment.

Referring also to FIG. 5, the write controller 310 has a QBNL buffer 312 for storing the lower eight bits of data meant for the QBN counter 110, QBNU buffer 313 for storing upper two bits of the same data, a TN buffer 314 for storing data (three bits) meant for the TN counter 120, a TIL buffer 315 for storing the lower eight bits of data to the T1 counter 160, a T1U buffer 316 for storing the upper three bits of the same data, a T2 buffer 317 for storing data (five bits) to the T2 counter 130, a T3 buffer 318 for storing data (six bits) to the T3 counter 140, and a setup pulse generator 319 for generating a setup pulse which commands write-in to such various counters. A particular address is given to each of the buffers 312–318 and setup pulse generator 319. As the CPU 500 delivers data to be written to each counter to the bus 600, the address decoder 311 selects one of the buffers 312–218 on an address basis with the result that the data is written to the buffer selected. On writing the necessary data in the buffer of interest, the CPU 500 outputs the address of the setup pulse generator 319 together with data indicative of whether or not a write command is present counter by counter. When the setup pulse generator 319 is enabled by the address decoder 311, it outputs a setup pulse meant for any of the counters with which a write command is associated. The outputs of the buffers 312–318 and setup pulse generator 319 are fed to all the time base counter circuits 100-1 to 100-8 as write data LD. However, only one of the time base counter circuits 100-1 to 100-8 which is selected by the active one of the selection control signals S1–S8 sets the counts of the counter group thereof on the basis of the write data LD.

The CPU 500 reads the counts out of the counter group of the time base counter circuit 100 of interest, as follows. On selecting one of the time base counter circuits 100-1 to 100-8, the CPU 500 sends out the corresponding number (e.g. #2 in the case of the time base counter circuit 100-2) to the bus 600 as data together with the address of the counter selector 400. As the counter selector 400 detects its own address on the address bus, it registers the number on the data bus at a number register 420. The time base counter circuits 100-1 to 100-8 each constantly delivers the counts of the counters (QBN, TN, T1, T2 and T3) thereof and carry pulses (TS, TF, MF26, MF51, SF and HF) to a multiplexer 410 as read data OD1–OD8. The multiplexer 410 selects one of the read data OD1–OD8 on the basis of the number registered at the number register 420 and transfers it to the read controller 350 of the counter controller 300.

The mobile station determines the timing conditions of signals to interchange with a base station by directly using output of the counter selector 400 (read data OD) which is the real-time representation of the counts of one of the time base counter circuits 100-1 to 100-8 selected or by using the counts which the CPU 500 reads out via the read controller 350. If desired, another counter selector 400 may be incorporated in circuitry, in which case each counter selector 400 will output the counts of particular ones of the time base counter circuits 100. This is successful in giving the read controller 350 some margin ill the execution of the control procedure. An example of the use of plural counters is illustrated with the dotted box 400' of FIG. 2.

Figure 6:
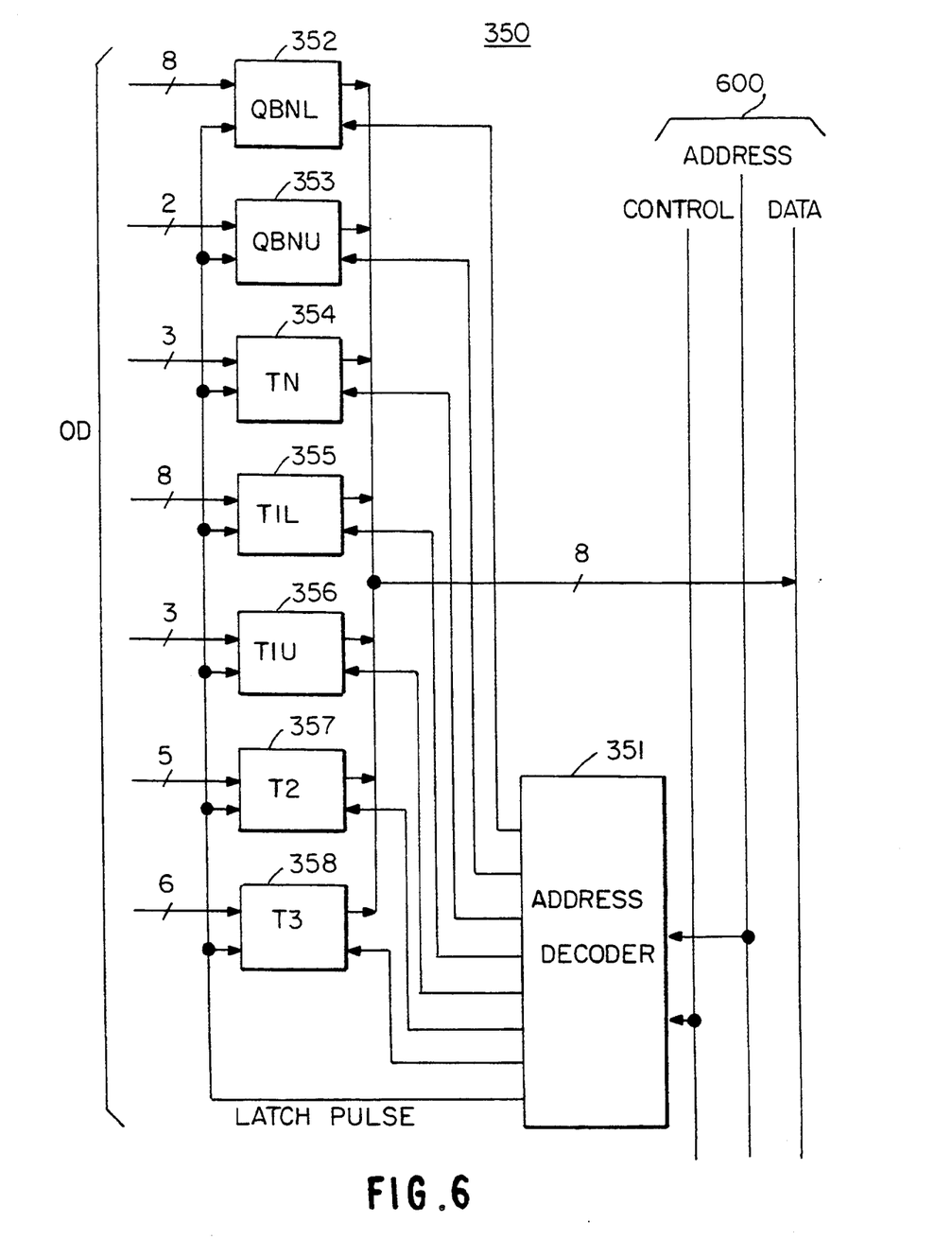
FIG. 6 is a block diagram schematically showing a specific construction of a read controller also included in the embodiment.

Referring also to FIG. 6, the read controller 350 has a QBNL buffer 352 for storing, among the read data OD, the lower eight bits of the data from the QBN counter 110, a QBNU buffer 353 for storing the upper two bits of the same data, a TN buffer 354 for storing the data (three bits) from the TN counter 120, a T1L buffer 355 for storing the lower eight bits of the data from the T1 counter 160, a T1U buffer 356 for storing the upper three bits of the same data, a T2 buffer 357 for storing the data (five bits) from the T2 counter 130, and a T3 buffer for storing the data (six bits) from the T3 counter 140. A common address for storing data at the same time and particular address for selectively reading data are assigned the above-mentioned buffers. As the CPU 500 feeds the common address to the bus 600 at the time for reading the counts of the above-stated counters, the address decoder 351 detects and delivers to all the buffers 352–358 a latch pulse for commanding them to store count data from the multiplexer 410. Subsequently, the CPU 500 delivers an address assigned to the counter of interest from which the count should be read (including the distinction of upper and lower bits). In response, the address decoder 351 selects one of the buffers 352–358 to output the stored data to the data bus.

While the embodiment has been shown and described in relation to an ETSI GSM PLMN mobile station, it will be apparent that the present invention is similarly applicable to a mobile station of any other TDMA cellular digital mobile communication system.

In summary, it will be seen that the present invention provides a synchronization control circuit which reduces the size and weight of a mobile station of a TDMA cellular digital mobile communication system while reducing the power consumption of such a mobile station. This unprecedented advantage is derived from the fact that the control circuit assigns to a plurality of time base counter circuits, a selector for selecting one of the counter circuits to write data and a selector for selecting one of the counter circuits to read data, i.e., only a single counter controller is necessary for setting and reading out the counts of the counter circuits.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any modifications or embodiments which fall within the true scope of the invention.

What is claimed is:

1. A synchronization control circuit for a mobile station which is included in a TDMA (Time Division Multiple Access) cellular digital mobile communication system for selectively interchanging digital signals with a number of mobile stations located in cells each being defined by one of a plurality of base stations which share a plurality of radio frequency carrier waves different in frequency and time base from one another on a time division basis, said circuit comprising:

a plurality of time base counter circuits each being assigned to a respective one of said plurality of radio frequency carrier waves for generating various timing signals necessary for said mobile station in response to clock pulses which are generated by a clock pulse source built in said mobile station;

a control signal source for generating counter circuit control signals for causing each of said plurality of time base counter circuits to perform at least one of start counting, stop counting, and reading counts thereof; and single counter controller means connected to and shared by said plurality of time base counter circuits and responsive to said control signals for selectively producing count outputs of one of said plurality of time base counter circuits as a time base signal of said mobile station.

2. The synchronization control circuit as claimed in claim 1, wherein said single counter controller means comprises:

temporary storage means for temporarily storing write information and read information for use by counters included in any one of said time base counter circuits and associated with said control signals;

a first counter selector responsive to said control signals for selectively enabling write information to be written from said temporary storage means to said counters; and a second counter selector for transferring the outputs of a selected one of said time base counter circuits to said temporary storage means.

3. The synchronization control circuit as claimed in claim 2, wherein said first counter selector comprises:

a register for receiving a number from said control signal source; and a decoder for activating one of a plurality of selection control signals based upon the number received by said register.

4. The synchronization control circuit as claimed in claim 2, wherein said second counter selector comprises:
   a register for receiving a number from said control signal source; and
   a multiplexer which selects read data from one of said plurality of time base counter circuits based upon the number received by said register.

5. The synchronization control circuit as claimed in claim 1, wherein said single counter controller means comprises:
   temporary storage means for temporarily storing write information and read information for use by counters included in any one of said time base counter circuits and associated with said control signals;
   a first counter selector responsive to said control signals for selectively enabling write information to be written from said temporary storage means to said counters; and
   a plurality of second counter selectors for transferring the outputs of selected ones of said time base counter circuits to said temporary storage means.

6. The synchronization control circuit as claimed in claim 2, wherein each of said time base counter circuits comprises:
   a first counter for counting clock pulses of an input signal and for outputting first carry pulses indicating beginning of a time slot assigned for communication;
   a second counter for counting said first carry pulses from said first counter and for outputting second carry pulses indicating beginning of a TDMA frame;
   a third counter for counting said second carry pulses from said second counter and for outputting third carry pulses indicating beginning of a multiframe at every twenty-sixth TDMA frame;
   a fourth counter for counting said second carry pulses from said second counter and for outputting fourth carry pulses indicating beginning of another multiframe at every fifty-first TDMA frame;
   an AND gate which outputs fifth pulses indicating beginning of a superframe when said third carry pulses and said fourth carry pulses appear simultaneously; and
   a fifth counter for counting said fifth pulses from said AND gate and for outputting sixth carry pulses indicating beginning of a hyperframe.

7. The synchronization control circuit as claimed in claim 6, wherein said temporary storage means includes a write controller, said write controller comprising:
   a first buffer for storing lower eight bits of data that is to be supplied to said first counter of a respective one of said time base counter circuits;
   a second buffer for storing upper two bits of said data that is to be supplied to said first counter of said respective one of said time base counter circuits;
   a third buffer for storing three bits of data that is to be supplied to said second counter of said respective one of said time base counter circuits;
   a fourth buffer for storing lower eight bits of data that is to be supplied to said fifth counter of said respective one of said time base counter circuits;
   a fifth buffer for storing upper three bits of said data that is to be supplied to said fifth counter of said respective one of said time base counter circuits;
   a sixth buffer for storing five bits of data that is to be supplied to said third counter of said respective one of said time base counter circuits;
   an seventh buffer for storing six bits of data that is to be supplied to said fourth counter of said respective one of said time base counter circuits; and
   a setup pulse generator for generating a setup pulse which represents a write-in command and for supplying said setup pulse to said first through fifth counters of said respective one of said time base counter circuits.

8. The synchronization control circuit as claimed in claim 6, wherein said temporary storage means includes a read controller, said read controller comprising:
   a first buffer for storing lower eight bits of read data received from said first counter of a respective one of said time base counter circuits;
   a second buffer for storing upper two bits of said read data;
   a third buffer for storing three bits of data received from said second counter of said respective one of said time base counter circuits;
   a fourth buffer for storing lower eight bits of data received from said fifth counter of said respective one of said time base counter circuits;
   a fifth buffer for storing upper three bits of said data received from said fifth counter of said respective one of said time base counter circuits;
   a sixth buffer for storing five bits of data received from said third counter of said respective one of said time base counter circuits; and
   a seventh buffer for storing six bits of data received from said fourth counter of said respective one of said time base counter circuits.

9. The synchronization control circuit as claimed in claim 5, wherein said first counter selector comprises:
   a register for receiving a number from said control signal source; and
   a decoder for activating one of a plurality of selection control signals based upon the number received by said register.

10. The synchronization control circuit as claimed in claim 5, wherein each of said second counter selectors comprises:
   a register for receiving a number from said control signal source; and
   a multiplexer which selects read data from one of said plurality of time base counter circuits based upon the number received by said register.

* * * * *

UNITED STATES PATENT AND TRADEMARK OFFICE
CERTIFICATE OF CORRECTION

PATENT NO. : 5,379,326
DATED : January 3, 1995
INVENTOR(S) : Kenji Nakahara et al It is certified that error appears in the above-indentified patent and that said Letters Patent is hereby corrected as shown below:

Column 3, line 31, delete "sots" insert —slats—.

Column 5, line 32, delete "ill" insert —in—.

Signed and Sealed this

Twenty-seventh Day of June, 1995

Attest:

BRUCE LEHMAN

Attesting Officer          Commissioner of Patents and Trademarks